United States Patent
Kubo et al.

(10) Patent No.: US 8,691,438 B2
(45) Date of Patent: Apr. 8, 2014

(54) CATHODE ACTIVE MATERIAL COATED WITH RESISTANCE-REDUCTION COATING LAYER, AND ALL SOLID-STATE LITHIUM SECONDARY BATTERY USING THE SAME

(75) Inventors: Hiroki Kubo, Toyota (JP); Yasushi Tsuchida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 465 days.

(21) Appl. No.: 12/989,824

(22) PCT Filed: Apr. 27, 2009

(86) PCT No.: PCT/IB2009/005396
§ 371 (c)(1),
(2), (4) Date: Oct. 27, 2010

(87) PCT Pub. No.: WO2009/133443
PCT Pub. Date: Nov. 5, 2009

(65) Prior Publication Data
US 2011/0045348 A1 Feb. 24, 2011

(30) Foreign Application Priority Data

Apr. 28, 2008 (JP) .................. 2008-117279

(51) Int. Cl.
*H01M 4/13* (2010.01)
*H01M 6/18* (2006.01)
(52) U.S. Cl.
USPC ............. 429/218.1; 429/231.3; 429/304
(58) Field of Classification Search
USPC ................................... 429/122–347
See application file for complete search history.

(56) References Cited

U.S. PATENT DOCUMENTS

| | | | |
|---|---|---|---|
| 6,001,508 A | 12/1999 | Passaniti et al. | |
| 6,881,520 B1 | 4/2005 | Li | |
| 2009/0081554 A1 | 3/2009 | Takeda et al. | |

FOREIGN PATENT DOCUMENTS

| | | |
|---|---|---|
| EP | 1 388 905 A2 | 2/2004 |
| EP | 1 560 282 A1 | 8/2005 |
| EP | 2 028 704 A1 | 2/2009 |
| JP | A-08-195219 | 7/1996 |
| JP | A-2001-006674 | 1/2001 |
| JP | A-2003-059492 | 2/2003 |
| JP | A-2008-091328 | 4/2008 |
| WO | WO 2007/004590 A1 | 1/2007 |

OTHER PUBLICATIONS

Japanese Office Action issued in Application No. 2008-117279; Dated Oct. 12, 2010 (With Translation).
Ohta et al., "LiNbO3-coated LiCoO2 as cathode material for all solid-state lithium secondary batteries," *Electrochemistry Communications*, vol. 9, No. 7, Jun. 15, 2007, pp. 1486-1490.
International Search Report issued in Application No. PCT/IB2009/005396; Dated Aug. 11, 2009.
Written Opinion of the International Searching Authority issued in Application No. PCT/IB2009/005396; Dated Aug. 11, 2009.

*Primary Examiner* — Jonathan G Leong
(74) *Attorney, Agent, or Firm* — Oliff PLC

(57) ABSTRACT

In a cathode active material coated with a resistance-reduction coating layer for preventing formation of a resistive layer, which has a cathode active material and a resistance-reduction coating layer with which a surface of the cathode active material is coated, the resistance-reduction coating layer contains substantially no fine particles of the cathode active material.

11 Claims, 6 Drawing Sheets

CATHODE ACTIVE MATERIAL COATED WITH RESISTANCE-REDUCTION COATING LAYER, AND ALL SOLID-STATE LITHIUM SECONDARY BATTERY USING THE SAME

FIELD OF THE INVENTION

The invention relates to a cathode active material which makes it possible to reduce resistance to movement of lithium ions between the cathode active material and a solid electrolyte material, and which is used for forming an all solid-state lithium secondary battery whose output reduction is suppressed.

BACKGROUND OF THE INVENTION

As information technology equipment and communications equipment, such as personal computers, video cameras and cellular mobile phones, rapidly come into widespread use in recent years, greater importance has been placed on the development of secondary batteries, such as lithium secondary batteries, serving as excellent power sources. In technical fields other than that of the information technology equipment and communications equipment, for example, in an automobile industry, too, high-output, high-capacity lithium secondary batteries for use in electric vehicles and hybrid vehicles as low-emission vehicles have been developed.

In the meantime, commercially available lithium secondary batteries that are currently on the market use an organic electrolytic solution or liquid electrolyte containing a flammable organic solvent as a solvent. Therefore, a safety device for restricting or avoiding a temperature rise in case of shortings need be mounted, or an improvement(s) in terms of the structure and/or materials for preventing shortings need be made.

On the other hand, an all solid-state lithium secondary battery, which is obtained by replacing the liquid electrolyte with a solid electrolyte and is formed entirely in a solid state, does not use a flammable organic solvent in the battery. Therefore, the all solid-state lithium secondary battery only requires a simple safety device, and is deemed excellent in terms of the manufacturing cost and the productivity.

The all solid-state lithium secondary battery includes a cathode layer, an anode layer, and an electrolyte disposed between the cathode layer and the anode layer, and the electrolyte consists of a solid. Accordingly, when only a cathode active material is used to form the cathode layer by powder molding, the electrolyte, which is a solid, is unlikely to penetrate into the cathode layer, and the interface between the cathode active material and the electrolyte is reduced, resulting in reduction of the battery performance. Thus, a cathode mixture containing a mixture of a powder of the cathode active material and a powder of the solid electrolyte is used to form a cathode layer, thereby to increase the area of the interface between the cathode active material and the electrolyte.

When the cathode layer is formed by powder molding, using the cathode mixture as described above, however, the interfacial resistance to movement of lithium ions at the interface between the cathode active material and the electrolyte (which may be simply called "interfacial resistance") tends to increase. This may be because the cathode active material reacts with the solid electrolyte, to form high-resistance portions on a surface of the cathode active material, as described in a non-patent document titled "$LiNbO_3$-coated $LiCoO_2$ as cathode material for all solid-state lithium secondary batteries" by N. Ohta et al., Electrochemistry Communications (2007), vol. 19, p. 1486-1490. Accordingly, technologies for improving the performance of the all solid-state lithium secondary battery by reducing the interfacial resistance have been disclosed. For example, a cathode active material formed such that a surface of $LiCoO_2$ (lithium cobalt oxide) is coated with $LiNbO_3$ (lithium niobate) is disclosed in the above-identified non-patent document. By using the disclosed cathode active material, it may be possible to curb or prevent formation of high-resistance portions at the interface between the cathode active material and the solid electrolyte, and reduce the interfacial resistance.

However, when the surface of the cathode active material is coated with a coating layer, fine particles of the cathode active material may be mixed into the coating layer, and high-resistance portions may be formed at contact areas between the fine particles of the cathode active material included in the coating layer, and the solid electrolyte. In this case, the resistance between the cathode active material and the solid electrolyte cannot be reduced, resulting in increase in the resistance and reduction in the output of the resulting battery.

SUMMARY OF THE INVENTION

The present invention provide a cathode active material which makes it possible to reduce resistance between the cathode active material and a solid electrolyte material during movement of lithium ions between the cathode active material and the solid electrolyte material, and which is used for forming an all solid-state lithium secondary battery whose output reduction is suppressed.

A first aspect of the invention is concerned with a cathode active material coated with a resistance-reduction coating layer, which includes a cathode active material and a resistance-reduction coating layer for preventing formation of a resistive layer. A surface of the cathode active material is coated with the resistance-reduction coating layer, and the resistance-reduction coating layer contains substantially no fine particles of the cathode active material.

In the cathode active material coated with the resistance-reduction coating layer according to the first aspect of the invention, high-resistance portions are prevented from being formed due to reaction between fine particles of the cathode active material in the resistance-reduction coating layer and a solid electrolyte material, and the cathode active material is unlikely to erode due to the growth of the high-resistance portions. Therefore, when an all solid-state lithium secondary battery is formed from these materials, the resistance between the cathode active material and the solid electrolyte material during movement of lithium ions between the cathode active material and the solid electrolyte material can be reduced, and reduction of the output of the battery can be suppressed.

A second aspect of the invention is concerned with a cathode active material coated with a resistance-reduction coating layer, which includes a cathode active material and a resistance-reduction coating layer for preventing formation of a resistive layer, and wherein a surface of the cathode active material is coated with the resistance-reduction coating layer. According to the second aspect of the invention, the resistance-reduction coating layer is formed solely of a material that is unreactive to the cathode active material and a solid electrolyte material and has lithium-ion conductivity.

In the cathode active material coated with the resistance-reduction coating layer according to the second aspect of the invention, high-resistance portions are prevented from being formed in the resistance-reduction coating layer. Therefore, when an all solid-state lithium secondary battery is formed from these materials, the resistance between the cathode active material and the solid electrolyte material during movement of lithium ions between the cathode active material and the solid electrolyte material can be reduced, and reduction of the output of the battery can be suppressed.

A third aspect of the invention is concerned with a cathode active material coated with a resistance-reduction coating layer. The coated cathode active material includes a cathode active material, and a resistance-reduction coating layer for preventing formation of a resistive layer, and a surface of the cathode active material is coated with the resistance-reduction coating layer. The resistance-reduction coating layer contains 80 vol % or more of a material that is unreactive to the cathode active material and a solid electrolyte material and has lithium-ion conductivity.

The resistance-reduction coating layer may contain 90 vol % or more of a material that is unreactive to the cathode active material and the solid electrolyte material and has lithium-ion conductivity.

A fourth aspect of the invention is concerned with a cathode active material coated with a resistance-reduction coating layer. The coated cathode active material includes a cathode active material, and a resistance-reduction coating layer for preventing formation of a resistive layer, and a surface of the cathode active material is coated with the resistance-reduction coating layer. The resistance-reduction coating layer contains no fine particles of the cathode active material which extend through the resistance-reduction coating layer.

The particle size of fine particles of the cathode active material contained in the resistance-reduction coating layer may be smaller than the average thickness of the resistance-reduction coating layer.

The particle size of fine particles of the cathode active material contained in the resistance-reduction coating layer may be less than 0.8 times as large as the average thickness of the resistance-reduction coating layer.

The particle size of fine particles of the cathode active material contained in the resistance-reduction coating layer may be less than 0.5 times as large as the average thickness of the resistance-reduction coating layer.

The thickness of the resistance-reduction coating layer may be in a range of 0.1 nm to 1000 nm.

The thickness of the resistance-reduction coating layer may be in a range of 0.1 nm to 500 nm.

The thickness of the resistance-reduction coating layer may be in a range of 0.1 nm to 100 nm.

According to a fifth aspect of the invention, an all solid-state lithium secondary battery is provided which includes a cathode layer formed using the cathode active material coated with the resistance-reduction coating layer according to any of the above aspects of the invention.

By using the cathode layer formed using the cathode active material coated with the resistance-reduction coating layer according to any of the above aspects of the invention, the resistance between the cathode active material and the solid electrolyte material can be reduced, and otherwise possible reduction of the output of the all solid-state lithium secondary battery can be suppressed.

A sixth aspect of the invention is concerned with a method of producing a cathode active material coated with a resistance-reduction coating layer for preventing formation of a resistive layer. The method includes a step of forming the resistance-reduction coating layer that contains substantially no fine particles of the cathode active material, on a surface of the cathode active material, using the cathode active material in which the volume percentage of fine particles having a particle size of 1 μm or smaller is 0.04% or lower.

In the production method as described above, the cathode active material in which the volume percentage of fine particles having a particle size of 1 μm or smaller is 0.02% or lower may be used.

In the production method as described above, the cathode active material in which the volume percentage of fine particles having a particle size of 1 μm or smaller is 0.01% or lower may be used.

The method of producing the cathode active material coated with the resistance-reduction coating layer according to the sixth aspect of the invention makes it unlikely that fine particles of the cathode active material penetrate into the resistance-reduction layer. As a result, the resistance-reduction coating layer contains substantially no fine particles of the cathode active material. Therefore, formation of high-resistance portions in the resistance-reduction coating layer and erosion of the cathode active material due to the growth of the high-resistance portions are suppressed or inhibited, so that the resistance between the cathode active material and the solid electrolyte material during movement of lithium ions between the cathode active material and the solid electrolyte material can be reduced. Thus, the cathode active material coated with the resistance-reduction coating layer provides an all solid-state lithium secondary battery whose output is less likely or unlikely to be reduced.

The cathode active material coated with the resistance-reduction coating layer and the method of producing the coated cathode active material according to the above aspects of the invention are advantageous in that, when an all solid-state secondary battery is formed using this material, the resistance between the cathode active material and the solid electrolyte material during movement of lithium ions between the cathode active material and the solid electrolyte material can be reduced, and otherwise possible reduction of the output of the battery can be suppressed or avoided.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
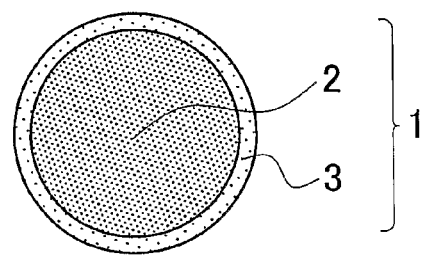
FIG. 1 is a cross-sectional view schematically showing one example of cathode active material coated with a resistance-reduction coating layer according to a first embodiment of the invention.

A cathode active material coated with a resistance-reduction coating layer for preventing formation of a resistive layer, an all solid-state lithium secondary battery, and a method of producing the cathode active material coated with the resistance-reduction coating layer according to the invention will be described in detail.

Initially, the cathode active material coated with the resistance-reduction coating layer according to the invention will be described. A cathode active material coated with a resistance-reduction coating layer according to a first embodiment of the invention has a cathode active material, and a resistance-reduction coating layer for preventing formation of a resistive layer, with which a surface of the cathode active material is coated, and is characterized in that substantially no fine particles of the cathode active material are contained in the resistance-reduction coating layer. A cathode active material coated with a resistance-reduction coating layer according to a second embodiment of the invention has a cathode active material, and a resistance-reduction coating layer for preventing formation of a resistive layer, with which a surface of the cathode active material is coated, and is characterized in that the resistance-reduction coating layer is formed solely of a material that is unreactive to the cathode active material and a solid electrolyte material and has lithium-ion conductivity. The cathode active material coated with the resistance-reduction coating layer according to each embodiment of the invention will be described in detail.

The cathode active material coated with the resistance-reduction coating layer according to the first embodiment of the invention has a cathode active material, and a resistance-reduction coating layer for preventing formation of a resistive layer, with which a surface of the cathode active material is coated, and is characterized in that substantially no fine particles of the cathode active material are contained in the resistance-reduction coating layer.

In the case where a surface of the cathode active material is coated with a coating layer, fine particles of the cathode active material that is reactive to a solid electrolyte material are likely to be mixed into the coating layer. If the fine particles of the cathode active material are present in the coating layer, high-resistance portions are formed at contact areas between the fine particles of the cathode active material mixed into the coating layer, and the solid electrolyte material. Furthermore, as the reaction between the fine particles of the cathode active material and the solid electrolyte material proceeds, the high-resistance portions grow and erode the cathode active material, and the resistance between the cathode active material and the solid electrolyte material cannot be reduced. In this embodiment, a surface of the cathode active material is coated with the resistance-reduction coating layer that contains substantially no fine particles of the cathode active material. By using the cathode active material coated with the resistance-reduction coating layer as described above, it possible to curb or prevent formation of high-resistance portions in the resistance-reduction coating layer, and erosion of the cathode active material due to the growth of the high-resistance portions.

A cathode layer may be formed by press-molding a material for forming a cathode, which is obtained by mixing the cathode active material coated with the resistance-reduction layer with the solid electrolyte material. In the cathode layer thus formed, the resistance-reduction coating layer contains substantially no fine particles of the cathode active material. Therefore, high-resistance portions that would reduce the lithium-ion conductivity are not formed in the resistance-reduction coating layer, and the cathode active material will not erode due to the growth of the high-resistance portions. Furthermore, the resistance-reduction coating layer, which has lithium-ion conductivity, does not impede conduction of lithium ions between the cathode active material and the solid electrolyte material. Accordingly, when an all solid-state lithium secondary battery is formed from these materials, the resistance between the cathode active material and the solid electrolyte material during movement of lithium ions between the cathode active material and the solid electrolyte material can be reduced, and reduction of the output of the battery can be suppressed.

In the following, the cathode active material coated with the resistance-reduction coating layer according to the first embodiment will be described with reference to the drawings. FIG. 1 is a cross-sectional view schematically showing one example of the cathode active material coated with the resistance-reduction coating layer according to this embodiment of the invention. The cathode active material coated with the resistance-reduction coating layer 1 as shown in FIG. 1 has a cathode active material 2, and a resistance-reduction coating layer 3 with which a surface of the cathode active material 2 is coated. In the following, each constituent element of the cathode active material coated with the resistance-reduction coating layer will be described in detail.

Initially, the resistance-reduction coating layer used in this embodiment will be explained. The resistance-reduction coating layer of this embodiment is formed by coating on a surface of the cathode active material, and contains substantially no fine particles of the cathode active material. In this embodiment, the surface of the cathode active material is coated with the resistance-reduction coating layer, and it is therefore possible to curb or prevent formation of high-resistance portions in the resistance-reduction coating layer, and erosion of the cathode active material due to the growth of the high-resistance portions, as described above. As a result, when an all solid-state lithium-ion secondary battery is formed from these materials, the resistance between the cathode active material and the solid electrolyte material during movement of lithium ions between the cathode active material and the solid electrolyte material is reduced, and reduction of the output of the battery is suppressed.

Figure 2:
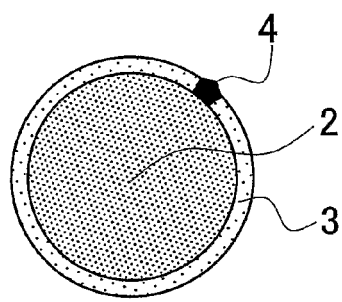
FIG. 2 is a schematic cross-sectional view showing, by way of example, a condition where fine particles of the cathode active material are contained in the resistance-reduction coating layer.

If fine particles 4 of the cathode active material are contained in the resistance-reduction coating layer 3, as shown in FIG. 2 by way of example, the fine particles 4 would react with the solid electrolyte material that contacts the fine particles 4 of the cathode active material, in the cathode layer formed of the cathode active material coated with the resistance-reduction layer having the fine particles 4 of the cathode active material, and the solid electrolyte material. In this case, high-resistance portions that would reduce the lithium-ion conductivity are formed at interfaces between the fine particles 4 of the cathode active material and the solid electrolyte material. Furthermore, as the reaction between the fine particles 4 of the cathode active material and the solid electrolyte material proceeds, the high-resistance portions would grow and erode the cathode active material 2. In this embodiment, since substantially no fine particles of the cathode active material are contained in the resistance-reduction coating layer, it is possible to curb or prevent formation of high-resistance portions in the resistance-reduction coating layer, and reduce the resistance between the cathode active material and the solid electrolyte material when an all solid-state lithium secondary battery is formed from these materials, thereby suppressing reduction of the output of the battery.

The above statement that "substantially no fine particles of the cathode active material are contained in the resistance-reduction coating layer" means that the resistance-reduction coating layer does not contain such fine particles of the cathode active material that make it difficult or impossible to reduce the resistance between the cathode active material and the solid electrolyte material during movement of lithium ions between the cathode active material and the solid electrolyte material when an all solid-state lithium secondary battery is formed from these materials. More specifically, it is preferable that the resistance-reduction coating layer does not contain fine particles of the cathode active material which extend through the resistance-reduction layer. If the resistance-reduction coating layer contains the cathode active material fine particles that extend through the resistance-reduction coating layer, high-resistance portions are formed at contact areas between the fine particles of the cathode active material and the solid electrolyte material, and then, the high-resistance portions may grow and erode the cathode active material. While the particle size of the fine particles of the cathode active material may vary depending on the thickness of the resistance-reduction coating layer, it is preferable that fine particles of the cathode active material having a particle size of 10 nm or larger, in particular, those having a particle size of 100 nm or larger, are not contained. In other words, it is preferable that the particle size of the fine particles of the cathode active material contained in the resistance-reduction coating layer is generally smaller than 100 nm, in particular, smaller than 10 nm, though the particle size varies depending on the thickness of the resistance-reduction coating layer. Also, it is preferable that the particle size of the fine particles of the cathode active material that are not contained in the resistance-reduction coating layer is 0.5 times or more as large as, in particular, 0.8 times or more as large as, more particularly, equal to or larger than the average thickness of the resistance-reduction coating layer. In other words, it is preferable that the particle size of the fine particles of the cathode active material contained in the resistance-reduction coating layer is smaller than the average thickness of the resistance-reduction coating layer, in particular, less than 0.8 times, more particularly, less than 0.5 times as large as the average thickness of the resistance-reduction coating layer.

The particle size of the fine particles of the cathode active material may be determined by using, for example, values measured based on an image analysis using an electron microscope. Also, the volume percentage of the fine particles of the cathode active material may be determined by using, for example, values derived from values measured based on an image analysis using an electron microscope. Specific materials and other features of the fine particles of the cathode active material are the same as or similar to those as will be described later concerning the cathode active material, and thus will not be explained herein.

A material used for forming the resistance-reduction coating layer is not particularly limited, but may be selected from any materials which can be applied by coating to the surface of the cathode active material, and which are unreactive to the cathode active material and the solid electrolyte material but have lithium-ion conductivity. More specifically, lithium niobate, lithium titanate, etc. may be used as the material for the resistance-reduction coating layer. In particular, lithium niobate is preferably used since it has excellent lithium-ion conductivity.

The thickness of the resistance-reduction coating layer is not particularly limited, but may be set to any value provided that it is possible to curb or prevent formation of high-resistance portions in the resistance-reduction coating layer, and reduce the resistance between the cathode active material and the solid electrolyte material during movement of lithium ions between the cathode active material and the solid electrolyte material when an all solid-state lithium secondary battery is formed from these material, thereby to suppress reduction of the output of the battery. For example, the thickness of the resistance-reduction layer is preferably in the range of 0.1 to 1000 nm, in particular, in the range of 0.1 to 500 nm, more particularly, 0.1 to 100 nm. If the thickness is smaller than the above-indicated ranges, it may be difficult to form the resistance-reduction layer on the surface of the cathode active material, and fine particles of the cathode active material which extend through the resistance-reduction coating layer are more likely to be present in the coating layer. If the thickness is larger than the above-indicated ranges, the resistance-reduction coating layer, which is formed with an excessively large thickness, may increase the resistance between the cathode active material and the solid electrolyte material during movement of lithium ions between the cathode active material and the solid electrolyte material.

In this embodiment, the thickness of the resistance-reduction coating layer may be determined by using values measured based on an image analysis using an electron microscope.

The cathode positive material used in this embodiment will be described. In the cathode active material coated with the resistance-reduction coating layer of this embodiment, the cathode positive material is coated with the resistance-reduction coating layer. The cathode active material used in this embodiment normally reacts with the solid electrolyte material, to form high-resistance portions on a surface of the cathode active material. In this embodiment, even where the cathode active material of this type is used, the surface of the cathode active material is coated with the resistance-reduction coating layer, so that high-resistance portions are prevented from being formed due to reaction between the cathode active material and the solid electrolyte material. Furthermore, erosion, or the like, of the cathode active material due to the growth of the high-resistance portions can be curbed or avoided. Therefore, when an all solid-state lithium secondary battery is formed from these materials, the resistance between the cathode active material and the solid electrolyte material during movement of lithium ions between the cathode active material and the solid electrolyte material is reduced, and reduction of the output of the battery is suppressed.

The cathode active material used in this embodiment is not particularly limited provided that it functions as a cathode active material. The cathode active material that normally reacts with the solid electrolyte material to form high-resistance portions on the surface of the cathode active material, as described above, is preferably used since the effect of this invention is particularly achieved. Also, the cathode active material preferably has a higher hardness than the solid electrolyte material. When the cathode active material, which is harder than the solid electrolyte material, is mixed with the solid electrolyte material, and these materials are then formed by press molding into a cathode layer, the solid electrolyte material, such as a sulfide-based solid electrolyte, crushes and covers the surface of the cathode active material. Therefore, if the cathode active material is not coated with the resistance-reduction coating layer, an area of contact between the cathode active material and the solid electrolyte increases, and high-resistance portions are more likely to be formed. By using the resistance-reduction coating layer according to the invention, it is possible to curb or prevent formation of high-resistance portions between the cathode active material and the solid electrolyte, and this effect of the invention is particularly achieved when a large number of high-resistance portions are formed such as when the cathode active material having a higher hardness than the solid electrolyte material is used. Specifically, the cathode active material may be selected from oxides, and the like, which are reactive to the solid electrolyte material. Examples of the cathode active material include lithium cobalt oxide, lithium nickel oxide, lithium manganese oxide, and lithium iron phosphate. In particular, lithium cobalt oxide and lithium nickel oxide are preferably used.

The average particle size of the cathode active material used in this embodiment is not particularly limited, provided that the cathode active material can be coated with the resistance-reduction coating layer, to provide a desired cathode active material coated with the resistance-reduction coating layer. It is preferable that the cathode active material has a smaller average particle size. As the average particle size of the cathode active material is smaller, the surface area of the cathode active material increases, and portions where lithium ions, etc. can move between the cathode active material and the solid electrolyte increase; therefore, the resistance between the cathode active material and the solid electrolyte material can be reduced, and the battery performance is enhanced. Furthermore, the thickness of the cathode active material can be made more uniform. Where lithium cobalt oxide is used as the cathode active material, for example, the average particle size of the cathode active material is preferably equal to or smaller than 15 μm, in particular, in the range of 1 μm to 10 μm, more particularly, in the range of 2.5 μm to 5 μm.

In this embodiment, the average particle size of the cathode active material may be determined by using values measured based on an image analysis using an electron microscope.

A method of producing the cathode active material coated with the resistance-reduction coating layer of this embodiment is not particularly limited, but may be any method by which the surface of the cathode active material is coated with the resistance-reduction coating layer, to provide a desired cathode active material coated with the resistance-reduction coating layer in which high-resistance portions are prevented from being formed in the resistance-reduction coating layer. For example, a method of producing the cathode active material coated with the resistance-reduction coating layer, which will be described later, may be employed.

The uses or applications of the cathode active material coated with the resistance-reduction coating layer of this embodiment are not particularly limited, but the coated cathode active material of this embodiment may be used as a cathode active material used in an all solid-state lithium secondary battery. In particular, it is preferable to use the coated cathode active material of this embodiment as a cathode active material used in all solid-state lithium secondary batteries for use in automobiles.

The cathode active material coated with the resistance-reduction coating layer according to the second embodiment of the invention has a cathode active material, and a resistance-reduction coating layer with which a surface of the cathode active material is coated, and is characterized in that the resistance-reduction coating layer is formed solely of a material that is unreactive to the cathode active material and a solid electrolyte material and has lithium-ion conductivity.

In the case where a surface of the cathode active material is coated with a coating layer, a substance, such as fine particles of the cathode active material, which is reactive to the solid electrolyte material is normally likely to be mixed into the coating layer. If the fine particles of the cathode active material, or the like, are present in the coating layer, high-resistance portions are formed at contact areas between the fine particles of the cathode active material mixed into the coating layer, and the solid electrolyte material, and the resistance between the cathode active material and the solid electrolyte material cannot be reduced. In this embodiment, the surface of the cathode active material is coated with the resistance-reduction coating layer formed solely of a material that is unreactive to the cathode active material and the solid electrolyte material and has lithium-ion conductivity. In the cathode active material coated with the resistance-reduction coating layer, therefore, high-resistance portions are less likely or unlikely to be formed in the resistance-reduction coating layer.

A cathode layer is generally formed by press-molding a material for forming a cathode, which is obtained by mixing the cathode active material coated with the resistance-reduction layer with the solid electrolyte material. In the cathode layer thus formed, the resistance-reduction coating layer is not reactive to the cathode active material and the solid electrolyte material. Therefore, high-resistance portions that would reduce the lithium-ion conductivity are not formed at the interface between the cathode active material and the resistance-reduction coating layer and the interface between the solid electrolyte material and the resistance-reduction coating layer, and the cathode active material will not erode due to the growth of the high-resistance portions. Furthermore, the resistance-reduction coating layer, which has lithium-ion conductivity, does not impede conduction of lithium ions between the cathode active material and the solid electrolyte material. Accordingly, when an all solid-state lithium secondary battery is formed from these materials, the resistance between the cathode active material and the solid electrolyte material during movement of lithium ions between the cathode active material and the solid electrolyte material is reduced, and reduction of the output of the battery is suppressed. In the following, each constituent element of the cathode active material coated with the resistance-reduction coating layer of this embodiment will be described in detail.

Initially, the resistance-reduction coating layer used in this embodiment will be explained. The resistance-reduction coating layer of this embodiment, which is formed by coating on a surface of the cathode active material, is formed solely of a material that is unreactive to the cathode active material and the solid electrolyte material and has lithium-ion conductivity. In this embodiment, the surface of the cathode active material is coated with the resistance-reduction coating layer, so that high-resistance portions are less likely or unlikely to be formed in the resistance-reduction coating layer, as described above. When an all solid-state lithium-ion secondary battery is formed from these materials, therefore, the resistance between the cathode active material and the solid electrolyte material during movement of lithium ions between the cathode active material and the solid electrolyte material is reduced, and reduction of the output of the battery is suppressed. The above statement that "the resistance-reduction coating layer is formed solely of a material that is unreactive to the cathode active material and the solid electrolyte material and has lithium-ion conductivity" is to be construed to indicate not only a condition where the resistance-reduction coating layer contains absolutely no material that is reactive to the cathode active material or the solid electrolyte material, but also a condition where the resistance-reduction coating layer contains some material that is reactive to the cathode active material or the solid electrolyte material, to such an extent as not to impair the effect of this embodiment. More specifically, the above statement indicates a condition where the resistance-reduction coating layer contains 80 vol % (volume percentage) or greater, more preferably, 90 vol % or greater of a material that is unreactive to the cathode active material and the solid electrolyte material and has lithium-ion conductivity. The volume percentage of the material that is unreactive to the cathode active material and the solid electrolyte material and has lithium-ion conductivity may be determined by using, for example, values derived from values measured based on an image analysis using an electron microscope.

Details of the resistance-reduction coating layer and the cathode active material, method of producing the cathode active material coated with the resistance-reduction coating layer, and the use or application of the coated cathode active material are substantially the same as those of the first embodiment as described above, and therefore will not be explained herein.

Next, the all solid-state lithium secondary battery according to the invention will be described in detail. The all solid-state lithium secondary battery is characterized by having the cathode layer formed using the cathode active material coated with the resistance-reduction coating layer as described above.

According to the invention, the cathode layer formed by using the cathode active material coated with the resistance-reduction coating layer, which can reduce resistance between the cathode active material and the solid electrolyte material and can suppress reduction of the output, is used, so as to provide the all solid-state lithium secondary battery in which the resistance between the cathode active material and the solid electrolyte material is reduced, and reduction of the output of the battery is suppressed.

Figure 3:
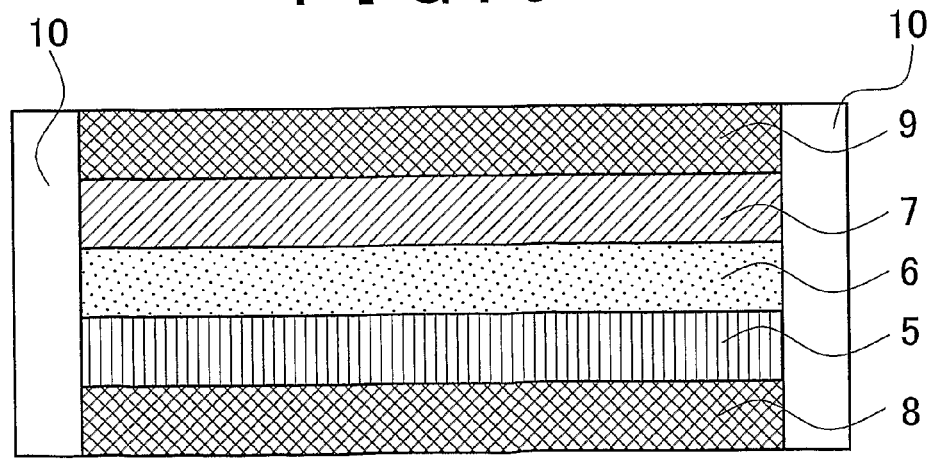
FIG. 3 is a cross-sectional view showing one example of all solid-state lithium secondary battery according to a second embodiment of the invention.

Next, the all solid-state lithium secondary battery of the present invention will be described with reference to the drawings. FIG. 3 is a cross-sectional view schematically showing, by way of example, the construction of the all solid-state lithium secondary battery of the invention. The all solid-state lithium secondary battery shown in FIG. 3 has the cathode layer 5 that can reduce resistance between the cathode active material and the solid electrolyte material and can suppress reduction of the output, a solid electrolyte layer 6 disposed on the cathode layer 5, and an anode layer 7 disposed on the solid electrolyte layer 6 such that the solid electrolyte layer 6 is sandwiched by and between the anode layer 7 and the cathode layer 5. Generally, a cathode collector 8 is disposed on the cathode layer 5, and an anode collector 9 is disposed on the anode layer 7, such that the cathode layer 5, solid electrolyte layer 6 and the anode layer 7 are sandwiched between the cathode collector 8 and the anode collector 9. Also, a battery case 10 is provided which covers side faces of the battery. The all solid-state secondary battery of the invention is not particularly limited provided that it has at least the cathode layer as described above, but the secondary battery normally further includes the anode layer, solid electrolyte layer, cathode collector, anode collector, battery case, and so forth, as described above. In the following, each constituent element of the all solid-state lithium secondary battery according to the invention will be described in detail.

Initially, the cathode layer used in the present invention will be explained. The cathode layer of the invention is characterized by being formed using the cathode active material coated with the resistance-reduction coating layer, which can reduce resistance between the cathode active material and the solid electrolyte material and can suppress reduction of the output of the battery.

The cathode layer of the invention, which is formed using the cathode active material coated with the resistance-reduction coating layer, normally includes the cathode active material coated with the resistance-reduction coating layer, and a solid electrolyte material as will be described later. In the cathode layer, since the resistance-reduction coating layer is unreactive to the cathode active material and the solid electrolyte material, high-resistance portions that would reduce lithium-ion conductivity are not formed at the interface between the cathode active material and the resistance-reduction coating layer and the interface between the solid electrolyte material and the resistance-reduction coating layer. Furthermore, the resistance-reduction coating layer, which has lithium-ion conductivity, does not impede conduction of lithium ions between the cathode active material and the solid electrolyte material. Thus, when the all solid-state lithium secondary battery is formed from these materials, the resistance between the cathode active material and the solid electrolyte material during movement of lithium ions between the cathode active material and the solid electrolyte material is reduced, and reduction of the output of the battery is suppressed.

The cathode active material coated with the resistance-reduction coating layer used in the cathode layer is substantially the same as the cathode active material coated with the resistance-reduction coating layer as described above, and therefore will not be explained herein.

The solid electrolyte material used in the cathode layer is not particularly limited provided that the material function as a solid electrolyte. Generally, a solid electrolyte material that is reactive to the cathode active material and forms high-resistance portions is used in the invention, as described above. Examples of the solid electrolyte material include, for example, a sulfide-based solid electrolyte, oxide-based solid electrolyte, polymer solid electrolyte, and so forth. In particular, the sulfide-based solid electrolyte is preferably used. The sulfide-based solid electrolyte is softer than the cathode active material. In the cathode layer formed from these materials by press molding, the sulfide-based solid electrolyte crushes and covers a surface of the cathode active material. Thus, if the cathode active material is not coated with the above-described resistance-reduction coating layer, the area of contact between the cathode active material and the solid electrolyte increases, and high-resistance portions are more likely to be formed. With the resistance-reduction coating layer provided according to the invention, high-resistance portions are less likely or unlikely to be formed between the cathode active material and the solid electrolyte, and this effect of the invention is particularly achieved when high-resistance portions tend to be formed such as when the sulfide-based solid electrolyte is used.

While the cathode layer is generally formed solely of the cathode active material coated with the resistance-reduction coating layer as described above, and the solid electrolyte material, the cathode layer may further contain other materials as needed. For example, the cathode layer may contain a conduction aid, such as acetylene black, ketjen black, and carbon fibers, for improvement of electrical conductivity.

The thickness of the cathode layer is not particularly limited, but may be made equivalent to those of cathode layers used in conventional all solid-state lithium secondary batteries.

The constituent elements of the all solid-state lithium secondary battery other than the above-described cathode layer, for example, the anode layer, solid electrolyte layer, cathode collector, anode collector and the battery case, will be hereinafter described in detail. The anode layer used in this invention is not particularly limited provided that it functions as an anode layer. An anode material used for the anode layer may be selected from materials used for conventional all solid-state lithium secondary batteries. For example, the anode layer may consist solely of an anode material, such as a metal foil, that functions as an anode or negative electrode, or may be formed of a mixture for an anode, which is obtained by mixing an anode active material with a solid electrolyte material. The anode layer may further contain a conduction aid, such as acetylene black, ketjen black, or carbon fibers, as needed, for improvement of electrical conductivity.

The thickness of the anode layer is not particularly limited, but may be made equivalent to those of anode layers used in conventional all solid-state lithium secondary batteries.

The solid electrolyte layer used in this invention is not particularly limited provided that it functions as a solid electrolyte layer. A solid electrolyte material used for the solid electrolyte layer may be selected from those used in conventional all solid-state lithium secondary batteries. Examples of the solid electrolyte material include, for example, a sulfide-based solid electrolyte, thio-LISICON, oxide-based solid electrolyte, chloride-based solid electrolyte, and a fluoride-based solid electrolyte.

The thickness of the solid electrolyte layer is not particularly limited, but may be made equivalent to those of solid electrolyte layers used in conventional all solid-state lithium secondary batteries.

The cathode collector used in this invention serves as a current collector for the cathode layer. The cathode collector is not particularly limited provided that it functions as a cathode collector. While the material of the cathode collector is not particularly limited provided that it has electrical conductivity, the cathode collector material may be selected from, for example, stainless steel, aluminum, nickel, iron, titanium and carbon. In particular, stainless steel is preferably used. Also, the cathode collector may be a dense collector or a porous collector.

The anode collector used in this invention serves as a current collector for the anode layer. The anode collector is not particularly limited provided that it functions as an anode collector. While the material of the anode collector is not particularly limited provided that it has electrical conductivity, the anode collector material may be selected from, for example, stainless steel, copper, nickel, iron, and carbon. In particular, stainless steel is preferably used. Also, the anode collector may be a dense collector or a porous collector.

The other constituent elements than those as described above, for example, the battery case, and resin used for sealing a coin-type battery case, or the like, will be described. The battery case and the resin are not particularly limited, but may be selected from those used in conventional all solid-state lithium second batteries. More specifically, the battery case may be generally made of a metal, such as stainless steel. An insulating ring, or the like, may also be used in place of the battery case. The battery case may also function as a current collector. More specifically, a battery case made of stainless steel may be prepared, and a part(s) of the battery case may be used as a current collector(s). The above-mentioned resin is preferably selected from resins, such as epoxy resin, having a low degree of water absorption.

The method of producing the all solid-state lithium secondary battery of the present invention is not particularly limited, but may be any method by which the above-described all solid-state lithium secondary battery can be produced. For example, the solid electrolyte material is subjected to press-molding, to form the solid electrolyte layer in a step of forming the solid electrolyte layer. Then, the anode material is deposited under pressure on the anode collector, to form the anode layer in a step of forming the anode layer.

Then, the above-described cathode active material coated with the resistance-reduction layer and the solid electrolyte material are mixed together, to provide a material for forming the cathode in a step of forming the cathode forming material. The step of forming the cathode forming material is not particularly limited provided that at least the cathode active material coated with the resistance-reduction coating layer and the solid electrolyte material can be uniformly mixed together. It is, however, preferable to mix these materials to such an extent as to maintain a condition where the surface of the cathode active material is coated with the resistance-reduction coating layer. Then, the cathode forming material obtained by mixing the cathode active material coated with the resistance-reduction coating layer with the solid electrolyte material is placed on the cathode collector, and the cathode forming material is subjected to press-molding, to form the cathode layer in a step of forming the cathode layer. Then, the anode layer is placed on the solid electrolyte layer, and the cathode layer is placed on the solid electrolyte layer such that the solid electrolyte layer is sandwiched by and between the anode layer and the cathode layer. Then, the resulting assembly of the anode layer, solid electrolyte layer and the cathode layer is placed in, for example, a coin-type battery case, and the battery case is sealed with a resin packing, so as to form a battery cell in a step of forming a battery cell. With these steps, the desired all solid-state lithium secondary battery as described above is obtained. Two or more of the above-described step of forming the solid electrolyte layer, step of forming the anode layer, step of forming the cathode forming material, step of forming the cathode layer, and step of forming the battery cell may be carried out at the same time, or the order of these steps may be changed, provided that the desired all solid-state lithium secondary battery as described above can be obtained. The method of producing the all solid-state lithium secondary battery may further include a step or steps other than the above-indicated steps, provided that the desired all solid-state lithium secondary battery as described above can be obtained.

The use of the all solid-state lithium secondary battery of this invention is not particularly limited, but the all solid-state lithium secondary battery may be used in, for example, an automobile.

The all solid-state lithium secondary battery of the invention may be of a coin-type or a laminate type, or may be cylindrical or rectangular in shape, or may be shaped otherwise. In particular, the rectangular or laminate-type lithium secondary battery is preferable, and the laminate-type lithium secondary battery is more preferable.

Next, a method of producing the cathode active material coated with the resistance-reduction coating layer will be described in detail. The method of producing the cathode active material coated with the resistance-reduction coating layer is characterized by using a cathode active material in which the volume percentage of fine particles having a particle size of 1 μm or smaller is 0.04% or lower, and including a step of forming the resistance-reduction coating layer containing substantially no fine particles of the cathode active material, on a surface of the cathode active material.

According to the present invention, the volume percentage of fine particles having a particle size of 1 μm or smaller in the cathode active material is made equal to or lower than 0.04%. Therefore, when the resistance-reduction coating layer is formed, the fine particles of the cathode active material, in particular, the fine particles that extend through the resistance-reduction coating layer, are not likely to enter the resistance-reduction coating layer. As a result, the resistance-reduction coating layer contains substantially no fine particles of the cathode active material. Accordingly, high-resistance portions are prevented from being formed in the resistance-reduction coating layer, and otherwise possible erosion of the cathode active material due to the growth of the high-resistance portions is curbed or avoided, so as to provide the cathode active material coated with the resistance-reduction coating layer, which can suppress reduction of the output of the resulting all solid-state lithium secondary battery.

Namely, when the cathode layer is formed using the cathode active material coated with the resistance-reduction coating layer, the cathode forming material obtained by, for example, mixing the cathode active material coated with the resistance-reduction coating layer with the solid electrolyte material is subjected to press-molding, to provide the cathode layer. Generally, the cathode active material and the solid electrolyte material are reactive to each other. In the cathode layer of the invention, the resistance-reduction coating layer contains substantially no fine particles of the cathode active material, in particular, no fine particles that extend through the resistance-reduction coating layer; therefore, high-resistance portions that would reduce the lithium-ion conductivity are not formed in the resistance-reduction coating layer, and the cathode active material will not erode due to the growth of the high-resistance portions. Furthermore, the resistance-reduction coating layer, which has lithium-ion conductivity, does not impede conduction of lithium ions between the cathode active material and the solid electrolyte material. Accordingly, when an all solid-state lithium secondary battery is finally formed using the cathode active material coated with the resistance-reduction coating layer, the resistance between the cathode active material and the solid electrolyte material during movement of lithium ions between the cathode active material and the solid electrolyte material can be reduced, and reduction of the output of the battery can be suppressed.

In the method of producing the cathode active material coated with the resistance-reduction coating layer of this invention, the cathode active material coated with the resistance-reduction coating layer may be obtained by carrying out the following steps. For example, in a precursor solution preparation step, starting materials of the resistance-reduction coating layer are mixed together in a solvent, to prepare a precursor solution for the resistance-reduction coating layer. Then, a sizing step of sizing a commercially available cathode active material is carried out so as to control the particle size, thereby to obtain a cathode active material in which the volume percentage of fine particles having a particle size of 1 μm or smaller is 0.04% or lower. Then, in a step of forming the resistance-reduction coating layer, the cathode active material in which the volume percentage of fine particles having a particle size of 1 μm or smaller is 0.04% or lower, and which is obtained by the sizing step, is used, and the precursor solution for the resistance-reduction coating layer obtained in the above precursor solution preparation step is applied by coating, such as spray coating using a rotating fluidized bed, to a surface of the above cathode active material, to form the resistance-reduction coating layer with a specified thickness, to thus provide the cathode active material coated with the resistance-reduction coating layer.

The method of producing the cathode forming material is not particularly limited, but may be any method having at least the step of forming the resistance-reduction coating layer as described above. In the following, each step of the method of producing the cathode active material coated with the resistance-reduction coating layer of the invention will be described in detail.

In the step of forming the resistance-reduction coating layer, the resistance-reduction layer having substantially no fine particles of the cathode active material is formed on the surface of the cathode active material, using the cathode active material in which the volume percentage of fine particles having a particle size of 1 μm or smaller is 0.04% or lower.

Through the above-described step, fine particles of the cathode active material, in particular, cathode active material fine particles that extend through the resistance-reduction coating layer, are less likely or unlikely to enter the resistance-reduction coating layer, as described above, and the resulting resistance-reduction coating layer contains substantially no fine particles of the cathode active material. Accordingly, high-resistance portions are prevented from being formed in the resistance-reduction coating layer, and the cathode active material will not erode due to the growth of the high-resistance portions. The statement that "the resistance-reduction coating layer contains substantially no fine particles of the cathode active material" refers to a condition where the resistance-reduction coating layer does not contain such fine particles of the cathode active material that make it difficult or impossible to reduce the resistance between the cathode active material and the solid electrolyte material during movement of lithium ions between the cathode active material and the solid electrolyte material in the resulting all solid-state lithium secondary battery. This condition has been specifically described in the above description concerning the cathode active material coated with the resistance coating layer, and therefore will not be described herein in detail.

A specific method of forming the resistance-reduction coating layer is not particularly limited, but may be any method by which the resistance-reduction coating layer as described above can be obtained. For example, a precursor solution for the resistance-reduction coating layer obtained in a precursor solution preparation step as will be described later may be applied by coating, such as spray coating using a rotating fluidized bed, to a surface of the cathode active material in which the volume percentage of fine particles having a particles size of 1 μm or smaller is 0.04% or lower, to form the resistance-reduction coating layer with a specified thickness. As another example of the method of forming the resistance-reduction coating layer, the cathode active material in which the volume percentage of fine particles having a particle size of 1 μm or smaller is 0.04% or lower may be dipped or immersed in a precursor solution for the resistance-reduction coating layer, and then taken out of the solution and dried. As a further example of the method, the cathode active material in which the volume percentage of fine particles having a particle size of 1 μm or smaller is 0.04% or lower and powder of starting materials of the resistance-reduction coating layer may be simply mixed together in a ball mill, or the like.

In the cathode active material used in this step, the percentage of fine particles having a particle size of 1 μm or smaller is 0.04% or lower. In particular, it is preferable that the voltage percentage of fine particles having a particle size of 1 μm or smaller is 0.02% or lower, more preferably, 0.01% or lower. With the above cathode active material used in this invention, fine particles of the cathode active material, in particular, fine particles that extend through the resistance-reduction coating layer, are less likely or unlikely to enter the resistance-reduction coating layer.

The particle size of the cathode active material may be determined by using values measured based on an image analysis using an electron microscope. Also, the volume percentage of fine particles having a particle size of 1 μm or smaller may be determined by using values derived from the particle size distribution measured using a laser diffraction type particle size distribution measurement device.

The materials of the resistance-reduction coating layer and the cathode active material used in this step and the average particle size of the cathode active material are identical with or similar to those as described above with regard to the cathode active material coated with the resistance-reduction coating layer, and therefore will not be described herein. Also, the precursor solution for the resistance-reduction coating layer used in this step is identical with or similar to a precursor solution as will be described later with regard to the step of preparing the precursor solution for the resistance-reduction coating layer, and therefore will not be described herein.

The method of producing the cathode active material coated with the resistance-reduction coating layer of this invention is not particularly limited, but may be any method having at least the above-described step of forming the resistance-reduction coating layer. In addition to the step of forming the resistance-reduction coating layer, the production method may include the step of preparing the precursor solution for the resistance-reduction coating layer, the sizing step, and other steps, as needed. In the following, the other steps than the step of forming the resistance-reduction coating layer, e.g., the step of preparing the precursor solution for the resistance-reduction coating layer and the sizing step, will be described.

In the precursor solution preparation step, the precursor solution for the resistance-reduction coating layer, which is used when the resistance-reduction coating layer is formed using the precursor solution for the resistance-reduction coating layer, is prepared in the step of forming the resistance-reduction coating layer.

Through the precursor solution preparation step, the precursor solution for the resistance-reduction coating layer can be obtained which is used when a method, such as spray coating using a rotating fluidized bed, is used in the step of forming the resistance-reduction coating layer, as described above.

In the precursor solution preparing step, the method of preparing the precursor solution for the resistance-reduction coating layer is not particularly limited, but may be any method by which a desired precursor solution for the resistance-reduction coating layer can be prepared. As one example of specific methods, starting materials of a precursor for the resistance-reduction coating layer may be mixed together in a solvent, such as ethanol.

The starting materials of the precursor for the resistance-reduction coating layer are not particularly limited, but may be suitably selected from generally used materials provided that a desired precursor solution for the resistance-reduction coating layer can be prepared. Also, conditions under which the starting materials of the precursor are mixed when preparing the precursor solution for the resistance-reduction coating layer are not particularly limited, but may be set as appropriate provided that the desired precursor solution for the resistance-reduction coating layer can be prepared under the set conditions.

In the sizing step, sizing or size classification is conducted so as to provide the cathode active material in which the volume percentage of fine particles having a particle size of 1 μm or smaller is 0.04% or lower.

Through the sizing step, the cathode active material in which the volume percentage of fine particles having a particle size of 1 μm or smaller is 0.04% or lower can be obtained for use in the step of forming the resistance-reduction coating layer. In this manner, the number of fine particles of the cathode active material which extend through the resistance-reduction coating layer can be reduced.

In the sizing step, the sizing method is not particularly limited, but may be any method by which desired sizing can be accomplished. As one example of specific methods, a commercially available cathode active material may be subjected to air classification, for example.

The commercially available cathode active material, or the like, used in the above sizing step is not particularly limited, but may be suitably selected from generally used materials, provided that desired sizing can be conducted on the material, to provide the cathode active material in which the volume percentage of fine particles having a particle size of 1 μm or smaller is 0.04% or lower. Also, conditions under which the sizing is carried out are not particularly limited, but may be set as appropriate provided that desired sizing can be accomplished under the set conditions.

The use or application of the cathode active material coated with the resistance-reduction coating layer obtained according to the invention is such as described above with regard to the cathode active material coated with the resistance-reduction coating layer, and therefore will not be explained herein.

In the following, the invention will be more specifically explained by showing some examples of the invention and comparative examples.

Example 1

A precursor solution for a resistance-reduction coating layer was prepared by adding and mixing $LiCoC_2H_5$ and $Nb(OC_2H_5)_5$ into ethanol, in a mole ratio of 1:1. Then, the particle size of a cathode active material, $LiCoO_2$, having the average particle size of 4 μm was controlled by air classification, so as to obtain a cathode active material in which the volume percentage of fine particles having a particle size of 1 μm or smaller is 0.04% or lower. The precursor solution for the resistance-reduction coating layer was applied by spray coating using a rotating fluidized bed to a surface of the cathode active material that has been sized, so as to provide the cathode active material coated with the resistance-reduction coating layer. The thickness of the resistance-reduction coating layer was controlled to be equal to 7 nm. In this connection, the thickness of the resistance-reduction coating layer was calculated from the surface area of $LiCoO_2$ and the amount of the sprayed precursor solution for the resistance-reduction coating layer. In order to form a battery cell, the cathode active material coated with the resistance-reduction coating layer obtained as described above and a sulfide-based solid electrolyte $Li_7P_3S_{11}$ formed by a method similar to that described in Japanese Patent Application Publication 2005-228570 (JP-A-2005-228570) are mixed together in a weight ratio of 7:3, to provide a material for forming a cathode. The cathode forming material is inserted into a molding jig and subjected to press-molding, to form a cathode layer. Then, a powder of a sulfide-based solid electrolyte $Li_2S$—$P_2S_5$ was inserted into a molding jig and subjected to press-molding, to form a sulfide-based solid electrolyte layer. Then, the sulfide-based solid electrolyte layer was sandwiched by and between the cathode layer and an In-film anode layer, to provide a battery cell.

Example 2

A battery cell was formed in the same manner as in Example 1, except that a cathode active material $LiCoO_2$ (having the average particle size of 10 μm) was used.

Example 3

A battery cell was formed in the same manner as in Example 1, except that a cathode active material $LiCoO_2$ (having the average particle size of 20 μm) was used.

Comparative Example 1

A battery cell was formed in the same manner as in Example 1, except that sizing was not conducted on the cathode active material, and the concentration of the precursor solution for the resistance-reduction coating layer was tripled.

Comparative Example 2

A battery cell was formed in the same manner as in Example 2, except that sizing was not conducted on the cathode active material, and the concentration of the precursor solution for the resistance-reduction coating layer was tripled.

Comparative Example 3

A battery cell was formed in the same manner as in Example 3, except that sizing was not conducted on the cathode active material, and the concentration of the precursor solution for the resistance-reduction coating layer was tripled.

Evaluations

Figure 4:
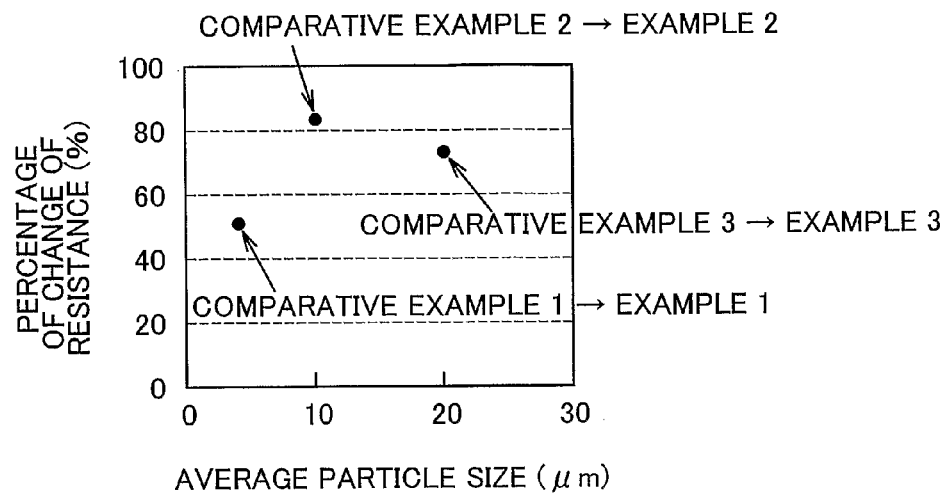
FIG. 4 is a graph in which the percentage (%) of change of the resistance between a cathode and an electrolyte is plotted against the average particle size of a $LiCoO_2$ cathode active material.

The battery cells obtained in Example 1, Example 2, Example 3, Comparative Example 1, Comparative Example 2 and Comparative Example 3 were put on charge, and the resistance between cathode and electrolyte of each cell was determined by measurement of impedance. In the graph of FIG. 4, the percentage (percentage of change of resistance, %) of the resistance between cathode and electrolyte of each of Example 1, Example 2 and Example 3 in which sizing was conducted, relative to the resistance between cathode and electrolyte of a corresponding one of Comparative Example 1, Comparative Example 2 and Comparative Example 3 in which sizing was not conducted, is plotted with respect to the average particle size of the $LiCoO_2$ cathode active material.

Measurement of Particle Size Distribution

Figure 5:
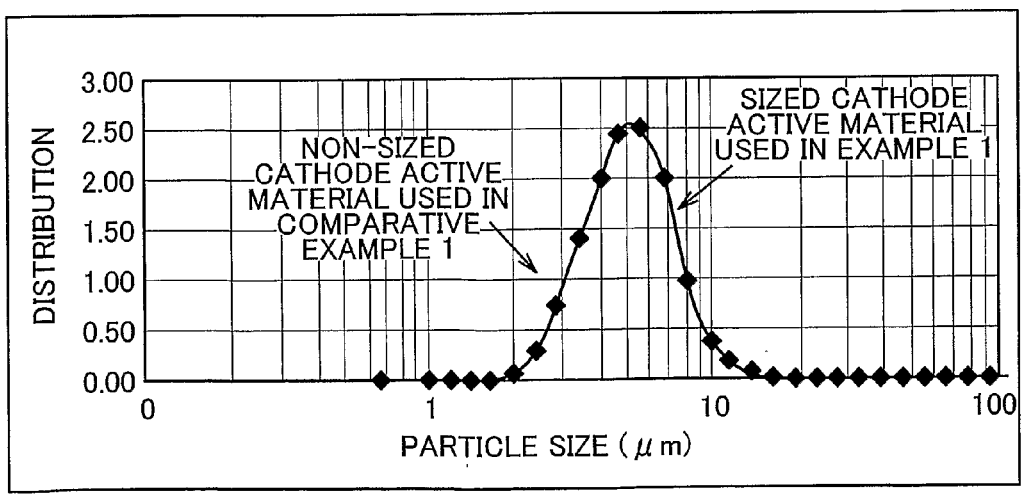
FIG. 5 is a graph showing the particle size distribution of a powder of cathode active material of Example 1 on which sizing was conducted, and that of a powder of cathode active material of Comparative Example 1 on which sizing was not conducted, which are plotted with respect to the particle size.
Figure 6:
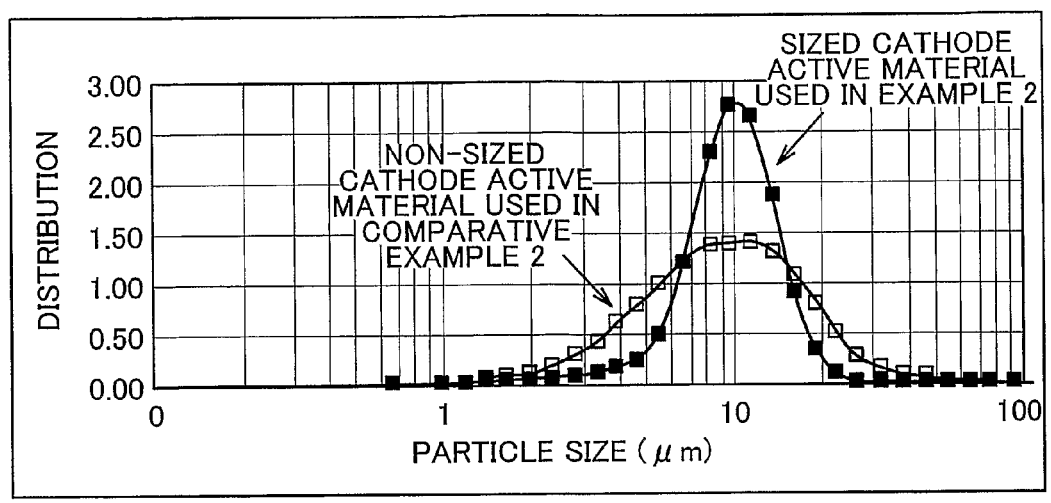
FIG. 6 is a graph showing the particle size distribution of a powder of cathode active material of Example 2 on which sizing was conducted, and that of a powder of cathode active material of Comparative Example 2 on which sizing was not conducted, which are plotted with respect to the particle size.
Figure 7:
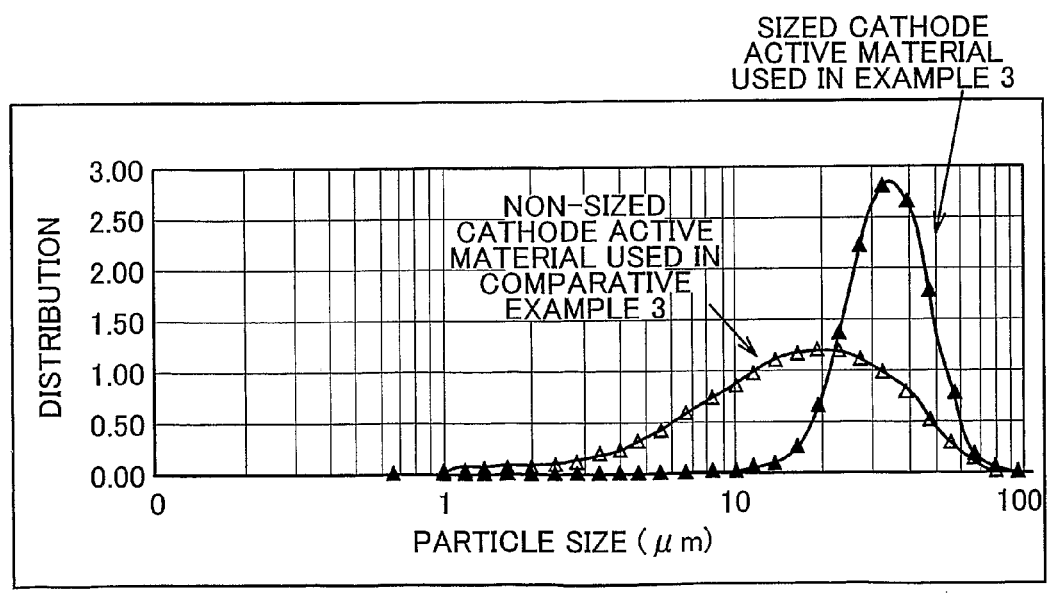
FIG. 7 is a graph showing the particle size distribution of a powder of cathode active material of Example 3 on which sizing was conducted, and that of a powder of cathode active material of Comparative Example 3 on which sizing was not conducted, which are plotted with respect to the particle size.

The particle size distribution was measured with respect to powders of the cathode active materials that were sized and used in Example 1, Example 2 and Example 3, and powders of the cathode active materials that were not sized and used in Comparative Example 1, Comparative Example 2 and Comparative Example 3. The particle size distribution was measured using a dry-type particle-size measuring instrument (HELOS available from Japan Laser Corporation). The thus obtained particle size distributions are indicated in FIG. 5 (Example 1 and Comparative Example 1), FIG. 6 (Example 2 and Comparative Example 2), and FIG. 7 (Example 3 and Comparative Example 3). Also, TABLE 1 below shows the volume percentage (%) of fine particles having a particle size of 1 μm or smaller and that of fine particles having a particle size of 2 μm or smaller, which were obtained from the particle size distribution for each of Example 1, Example 2, Example 3, Comparative Example 1, Comparative Example 2 and Comparative Example 3.

TABLE 1

| | | Average Particle Size (μm) | Volume Percentage (%) | |
|---|---|---|---|---|
| | | | 1 μm or less | 2 μm or less |
| Ex. 1 | Sized Cathode Active Material | 4 | 0 | 0.04 |
| Ex. 2 | | 10 | 0 | 0.07 |
| Ex. 3 | | 20 | 0.01 | 0.01 |
| Com. Ex. 1 | Non-Sized Cathode Active Material | 4 | 0.13 | 2.35 |
| Com. Ex. 2 | | 10 | 0.05 | 0.28 |
| Com. Ex. 3 | | 20 | 0.05 | 0.28 |

Observation with TEM Photograph

Figure 8:
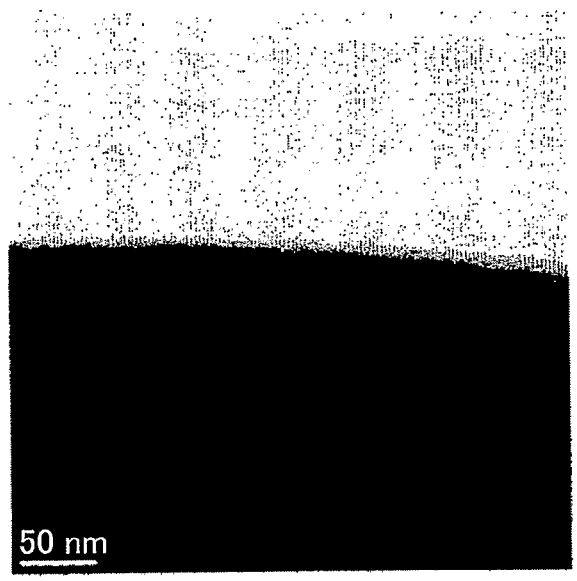
FIG. 8 is a TEM photograph of a cathode active material coated with a resistance-reduction coating layer, which was formed in the same manner as in Example 2.
Figure 9:
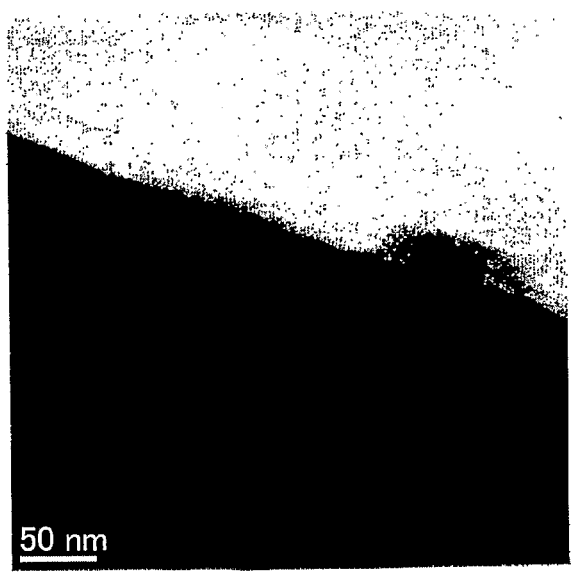
FIG. 9 is a TEM photograph of a cathode active material coated with a resistance-reduction coating layer, which was formed in the same manner as in Comparative Example 2.

The cathode active materials coated with the resistance-reduction coating layers, which were formed in the same manners as Example 2 and Comparative Example 2, were observed with TEM. The thus obtained TEM photographs are shown in FIG. 8 (Example 2) and FIG. 9 (Comparative Example 2).

TEM-EDX Analysis

Figure 10A:
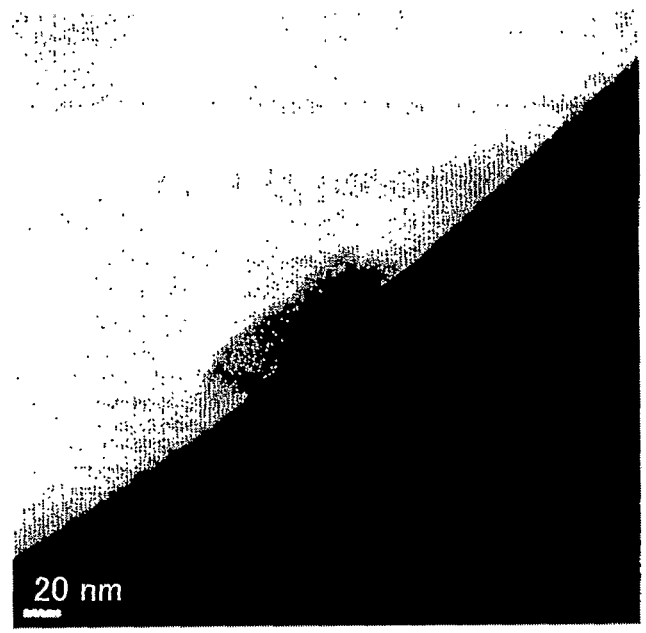
FIG. 10A is a TEM photograph of a cathode active material coated with a resistance-reduction coating layer, which was formed in the same manner as in Comparative Example 2.
Figure 10B:
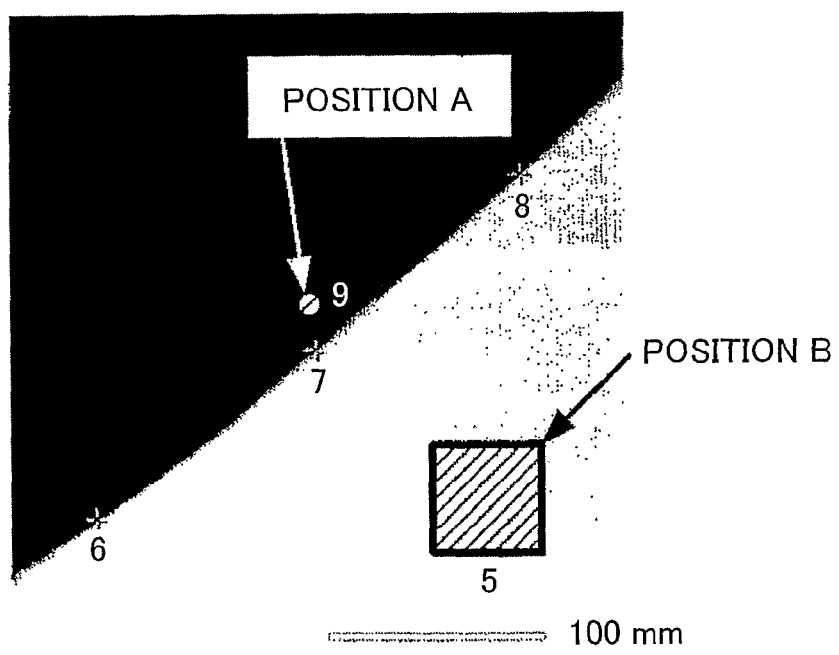
FIG. 10B is a view indicating positions at which the EDX analysis was conducted.

The cathode active material coated with the resistance-reduction coating layer, which was formed in the same manner as Comparative Example 2, was subjected to an EDX analysis. FIG. 10A shows a TEM photograph of the EDX-analyzed cathode active material coated with the resistance-reduction coating layer, and FIG. 10B indicates positions at which the analysis was conducted.

Ultrafine Electron-Beam Diffraction

Figure 11A:
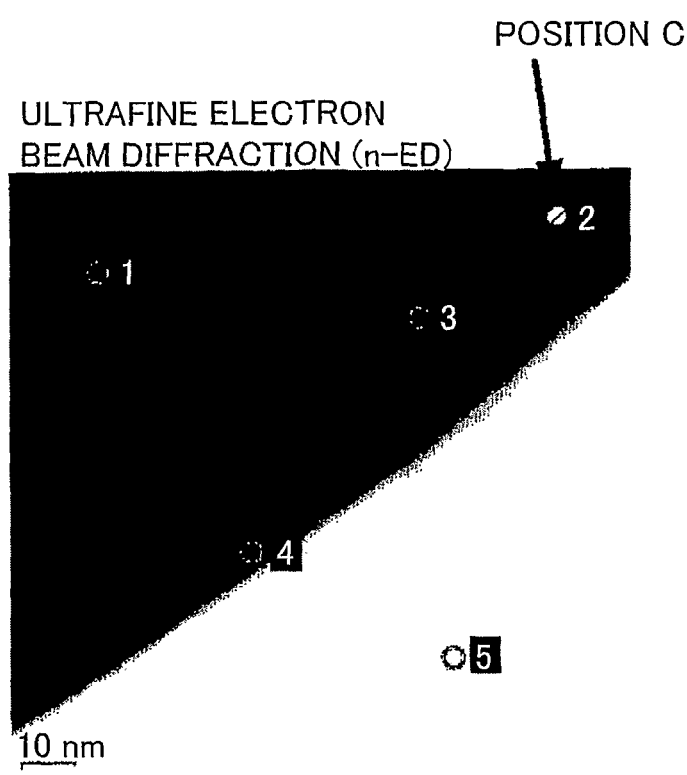
FIG. 11A is a view indicating positions at which the analysis using ultrafine electron beam diffraction was conducted, in a cathode active material coated with a resistance-reduction coating layer formed in the same manner as in Comparative Example 2.
Figure 11B:
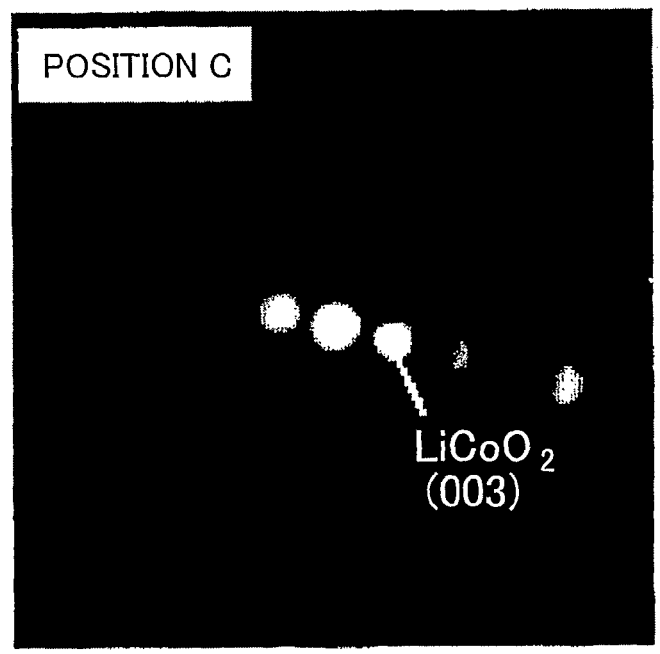
FIG. 11B is a view showing the result of the analysis at one of the positions shown in FIG. 11A.

The cathode active material coated with the resistance-reduction coating layer, which was formed in the same manner as Comparative Example 2, was analyzed by ultrafine electron-beam diffraction. FIG. 11A indicates positions at which the analysis was conducted, and FIG. 11*b* shows a result of the analysis at position C.

When the average particle size of the $LiCoO_2$ cathode active material was 4 μm, and the cathode active material was sized, the percentage of change of the resistance (Comparative Example 1→Example 1) was below 60% as shown in FIG. 4, which means that the resistance was reduced by the largest degree. When the average particle size of the $LiCoO_2$ cathode active material was 10 μm, and the cathode active material was sized, the percentage of change of the resistance (Comparative Example 2→Comparative Example 2) was 80%, which means that the resistance was reduced but the degree of the reduction was smaller than that of the above case (Comparative Example 1→Example 1). Similarly, when the average particle size of the LiCoO$_2$ cathode active material was 20 μm, and the cathode active material was sized, the percentage of change of the resistance (Comparative Example 3→Example 3) was about 70%, which means that the resistance was reduced but the degree of the reduction was smaller than that of the above case (Comparative Example 1→Example 1).

In Example 1 in which the average particle size of the LiCoO$_2$ cathode active material was 4 μm and sizing was conducted, the volume percentage of fine particles having a particle size of 1 μm or smaller was 0%, as indicated in TABLE 1. In Example 2 in which the average particle size was 10 μm and sizing was conducted, the volume percentage of fine particles having a particle size of 1 μm or smaller was 0%. In Example 3 in which the average particle size was 20 μm and sizing was conducted, the volume percentage of fine particles having a particle size of 1 μm or smaller was 0.01%. Thus, it was confirmed that, in the examples in which sizing was conducted, the volume percentage of fine particles having a particle size of 1 μm or smaller was 0.04% or lower. On the other hand, in Comparative Example 1 in which the average particle size of the LiCoO$_2$ was 4 μm and sizing was not conducted, the volume percentage of fine particles having a particle size of 1 μm or smaller was 0.13%. In Comparative Example 2 in which the average particle size was 10 μm and sizing was not conducted, the volume percentage of fine particles having a particle size of 1 μm or smaller was 0.05%. In Comparative Example 3 in which the average particle size was 20 μm and sizing was not conducted, the volume percentage of fine particles having a particle size of 1 μm or smaller was 0.05%. Thus, in the comparative examples in which sizing was not conducted, the volume percentage of fine particles having a particle size of 1 μm or smaller was greater than 0.04%.

In Example 2, no fine particles of the cathode active material were contained in the resistance-reduction coating layer, as shown in the TEM photograph of FIG. 8. On the other hand, in Comparative Example 2, fine particles of the cathode active material were contained in the resistance-reduction coating layer, as shown in the TEM photograph of FIG. 9. Thus, in the examples in which sizing was conducted, the inclusion of fine particles of the cathode active material into the resistance-reduction coating layer was greatly restricted or inhibited. On the other hand, in the comparative examples in which sizing was not conducted, the inclusion of fine particles of the cathode active material into the resistance-reduction coating layer was not restricted or inhibited. It was found from the EDX analysis that the result of the elemental analysis of fine particles (at position A) in the resistance-reduction coating layer shown in FIG. 10B was substantially the same as that of the cathode active material (at position B); therefore, the fine particles at position A were presumed to be those of the cathode active material. Also, the result of the analysis using ultrafine electron beam diffraction as shown in FIG. 11B indicates that fine particles (at position C) in the resistance-reduction coating layer were identical with the cathode active material.

It is understood from the above results that, in the examples of the invention, the resistance-reduction coating layer does not contain fine particles of the cathode active material which would make it difficult or impossible to reduce the resistance between the cathode active material and the solid electrolyte material. Thus, high-resistance portions are prevented from being formed in the resistance-reduction coating layer. Therefore, when an all solid-state lithium secondary battery is formed from these materials, the resistance between the cathode active material and the solid electrolyte material during movement of lithium ions between the cathode active material and the solid electrolyte material can be reduced. In particular, when the average particle size of the cathode active material was as small as 4 μm, and sizing was conducted, the percentage of change of the resistance (Comparative Example 1→Example 1) was lower than 60%, i.e., the resistance was reduced by the largest degree. This may be because the volume percentage of fine particles was significantly reduced through sizing of the cathode active material of Comparative Example 1 in which the volume percentage of fine particles was originally large, as shown in TABLE 1, so that the fine particles of the cathode active material contained in the resistance-reduction coating layer could be greatly reduced.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A cathode active material coated with a lithium-ion conductivity coating layer, comprising:
   a core comprising a cathode active material; and
   a lithium-ion conductivity coating layer coated to surround said core, said lithium-ion conductivity coating layer comprising particles of the cathode active material having a particle size smaller than the average thickness of the lithium-ion conductivity coating layer, wherein
   the lithium-ion conductivity coating layer contains no particles of the cathode active material which extend through the lithium-ion conductivity coating layer.

2. The cathode active material coated with the lithium-ion conductivity coating layer according to claim 1, wherein the particle size of particles of the cathode active material contained in the lithium-ion conductivity coating layer is less than 0.8 times as large as the average thickness of the lithium-ion conductivity coating layer.

3. The cathode active material coated with the lithium-ion conductivity coating layer according to claim 1, wherein the particle size of particles of the cathode active material contained in the lithium-ion conductivity coating layer is less than 0.5 times as large as the average thickness of the lithium-ion conductivity coating layer.

4. The cathode active material coated with the lithium-ion conductivity coating layer according to claim 1, wherein the thickness of the lithium-ion conductivity coating layer is in a range of 0.1 nm to 1000 nm.

5. The cathode active material coated with the lithium-ion conductivity coating layer according to claim 1, wherein the thickness of the lithium-ion conductivity coating layer is in a range of 0.1 nm to 500 nm.

6. The cathode active material coated with the lithium-ion conductivity coating layer according to claim 1, wherein the thickness of the lithium-ion conductivity coating layer is in a range of 0.1 nm to 100 nm.

7. An all solid-state lithium secondary battery comprising:
   a cathode layer formed using the cathode active material coated with the lithium-ion conductivity coating layer according to claim 1; and
   a solid electrolyte material.

8. A method of producing a cathode active material coated with a lithium-ion conductivity coating layer, comprising a step of forming the lithium-ion conductivity coating layer that contains particles of the cathode active material, so to surround a surface of a core comprising the cathode active material, using the cathode active material in which the volume percentage of particles having a particle size of 1 μm or smaller is 0.04% or lower, wherein the particles of the cathode active material in the lithium-ion conductivity coating layer have a particle size smaller than the average thickness of the lithium-ion conductivity coating layer, and the lithium-ion conductivity coating layer contains no particles of the cathode active material which extend through the lithium-ion conductivity coating layer.

9. The method of producing a cathode active material coated with a lithium-ion conductivity coating layer according to claim 8, wherein the volume percentage of particles having a particle size of 1 μm or smaller in the cathode active material is 0.02% or lower.

10. The method of producing a cathode active material coated with a lithium-ion conductivity coating layer according to claim 8, wherein the volume percentage of particles having a particle size of 1 μm or smaller in the cathode active material is 0.01% or lower.

11. A method of producing an all solid-state lithium secondary battery comprising:
   a step of producing a cathode active material according to claim 8; and
   a step of producing a cathode layer, mixing the cathode active material with a solid electrolyte material.

* * * * *